(12) United States Patent (10) Patent No.: US 7,971,147 B2
Subbarao et al. (45) Date of Patent: Jun. 28, 2011

(54) METHODS AND SYSTEMS FOR AUTOMATICALLY CREATING A SITE MENU

(75) Inventors: Murali Subbarao, Saratoga, CA (US); Allwyn Lobo, Campbell, CA (US); Shankar Chittoor, Fremont, CA (US); Rajesh Lalwani, Saratoga, CA (US)

(73) Assignee: Billeo, Inc., Santa Clara, CA (US)

( * ) Notice: Subject to any disclaimer, the term of this patent is extended or adjusted under 35 U.S.C. 154(b) by 1376 days.

(21) Appl. No.: 11/491,419

(22) Filed: Jul. 21, 2006

(65) Prior Publication Data

US 2007/0022419 A1    Jan. 25, 2007

Related U.S. Application Data

(60) Provisional application No. 60/702,120, filed on Jul. 25, 2005.

(51) Int. Cl.
*G06F 3/00* (2006.01)
*G06F 3/048* (2006.01)
*G06F 17/00* (2006.01)

(52) U.S. Cl. ........ 715/762; 715/763; 715/764; 715/765; 715/204; 715/206; 709/217; 709/218

(58) Field of Classification Search .................. 715/204, 715/206, 207, 243, 253, 760–765; 709/217, 709/218; 717/108
See application file for complete search history.

(56) References Cited

U.S. PATENT DOCUMENTS

| | | | |
|---|---|---|---|
| 6,704,729 B1* | 3/2004 | Klein et al. ............................ 1/1 |
| 6,826,553 B1* | 11/2004 | DaCosta et al. ...................... 1/1 |
| 7,289,980 B2* | 10/2007 | Kogut-O'Connell et al. ........ 1/1 |
| 7,398,271 B1* | 7/2008 | Borkovsky et al. .................. 1/1 |
| 2002/0186255 A1* | 12/2002 | Shafron et al. ................. 345/810 |
| 2003/0088517 A1* | 5/2003 | Medoff ............................. 705/59 |
| 2003/0126027 A1* | 7/2003 | Nelson et al. .................... 705/26 |
| 2004/0025057 A1* | 2/2004 | Cook ............................. 713/201 |
| 2004/0070606 A1* | 4/2004 | Yang et al. ..................... 345/745 |
| 2004/0254832 A1* | 12/2004 | Harkin ............................. 705/14 |
| 2005/0097008 A1* | 5/2005 | Ehring et al. .................... 705/26 |
| 2008/0319955 A1* | 12/2008 | Douglass et al. ................. 707/3 |

* cited by examiner

*Primary Examiner* — Tadeese Hailu
(74) *Attorney, Agent, or Firm* — William L. Botjer (57) ABSTRACT

A method, system and computer program product for organizing and presenting web page information to a user. A browser plug-in extracts a domain name for the web page. Subsequently, a web page category is determined based on the menu table stored in the central repository. The browser plug-in captures the web links included in the web page based on the category of the web page. The captured web links are presented to a user on the browser plug-in.

15 Claims, 7 Drawing Sheets

METHODS AND SYSTEMS FOR AUTOMATICALLY CREATING A SITE MENU

RELATED APPLICATIONS

This application claims priority of U.S. Provisional Patent Application Ser. No. 60/702,120, filed on Jul. 25, 2005, which is hereby incorporated by reference as if set forth herein in its entirety.

BACKGROUND

The present invention relates to the Internet. More particularly the present invention relates to navigation of web pages over the Internet.

The World Wide Web of the Internet is a significant contribution to the field of computing. In the web environment, user machines effect transactions with web servers using the Hypertext Transfer Protocol (HTTP). HTTP is a known application protocol that provides access to files (e.g., text, graphics, images, sound, video, etc.) on the web server.

A web page is a document created with HTML (HyperText Markup Language) that is part of a group of hypertext documents or resources available on the World Wide Web. Collectively, these documents and resources form what is known as a web site. A unique Uniform Resource Locator (URL) is assigned for presenting any webpage or resource on the internet. The URL is an address that specifies the location of a file on the Internet. A web page may have links to other files and servers on the Internet. Generally, the links are categorized as a menu. The menu includes a set of hypertext links to more details. The menu may direct the user to other web pages or files located within the server or at other servers. For example, the web pages of Business Week (www.businessweek.com) offer a menu that is placed horizontally at the top of the web page. The appearance, format and location of the menu may differ with every web page, and some times even with every web page within the same web site.

In addition, various web sites provide similar services over the Internet. For instance, web sites maintained by various basking institutions provide identical services. These services require the user to perform actions that are common among all these different web sites. For instance, actions such as "contact for customer services", or "know your account summary", etc. are commonly provided by various online banking web sites. However, the description of such common actions may not be identical across such web sites. For example, the home page for American Express has a link for performing the action of bill payment, with a description that says "Check and pay your bill". This link is listed in a menu for "Small Businesses". On the other hand, the home page for Citibank has a link for executing the same action of bill payment with the description "Bill Payment". Moreover, this link has been listed in a drop-down menu under the title "look for a product or service".

The content of services provided by various web sites is confidential. The confidential information includes personal messages, financial transactions made, balance available and the like. Access to this information is permitted through an authentication mechanism such as username and password; or by disclosing personal account details such as account number. Links to access such confidential information can be obtained for that user only after authentication information is provided.

In light of the above discussion, there is a need for a method and a system for automatically presenting a menu of links for accessing similar web pages on different web sites in a consistent, user-friendly manner to a user. Moreover, the method and the system should enable organizing and presenting access to a variety of web pages, such as statements, bills, payment confirmation, and the like. The method should also permit learning from the community of users about web pages most frequently accessed within a web site and presenting it to all users.

SUMMARY OF THE INVENTION

An object of the present invention is to provide a method, a system, and a computer program that displays information contained within a Web page in the form of links, in a user-friendly manner, through a dynamic user interface inside the browser, and a uniform way of navigating to web pages for frequently accessed information across web sites.

Another object of the present invention is to provide a method, a system, and a computer program to create an automated browser plug-in inside the browser that enables the user as well as the community of all users to efficiently navigate through such information contained in a web page. The browser plug-in presents the user with the information contained in a web page by grouping the information into common categories.

Another object of the present invention is to provide a method, a system, and a computer program to obtain information contained in new web pages accessed by a user and enables the user to efficiently navigate through this information.

Another object of the present invention is to provide a method, a system, and a computer program for overriding of the automatic mapping for a specific domain. The override can be for the menu item keyword, or URL or image URL information, which is used by the browser plug-in to create the URL.

Yet another object of the present invention is to provide a method, system and computer program to create an automated browser plug-in that presents the user with the information contained by a web page which can be accessed only after some form of authentication by the user.

BRIEF DESCRIPTION OF THE DRAWINGS

The preferred embodiments of the invention will hereinafter be described in conjunction with the appended drawings provided to illustrate, and not to limit the invention, wherein like designations denote like elements, and in which.

DETAILED DESCRIPTION

The various embodiments of the present invention provide a method, a system and a computer program for navigating web pages.

Figure 1:
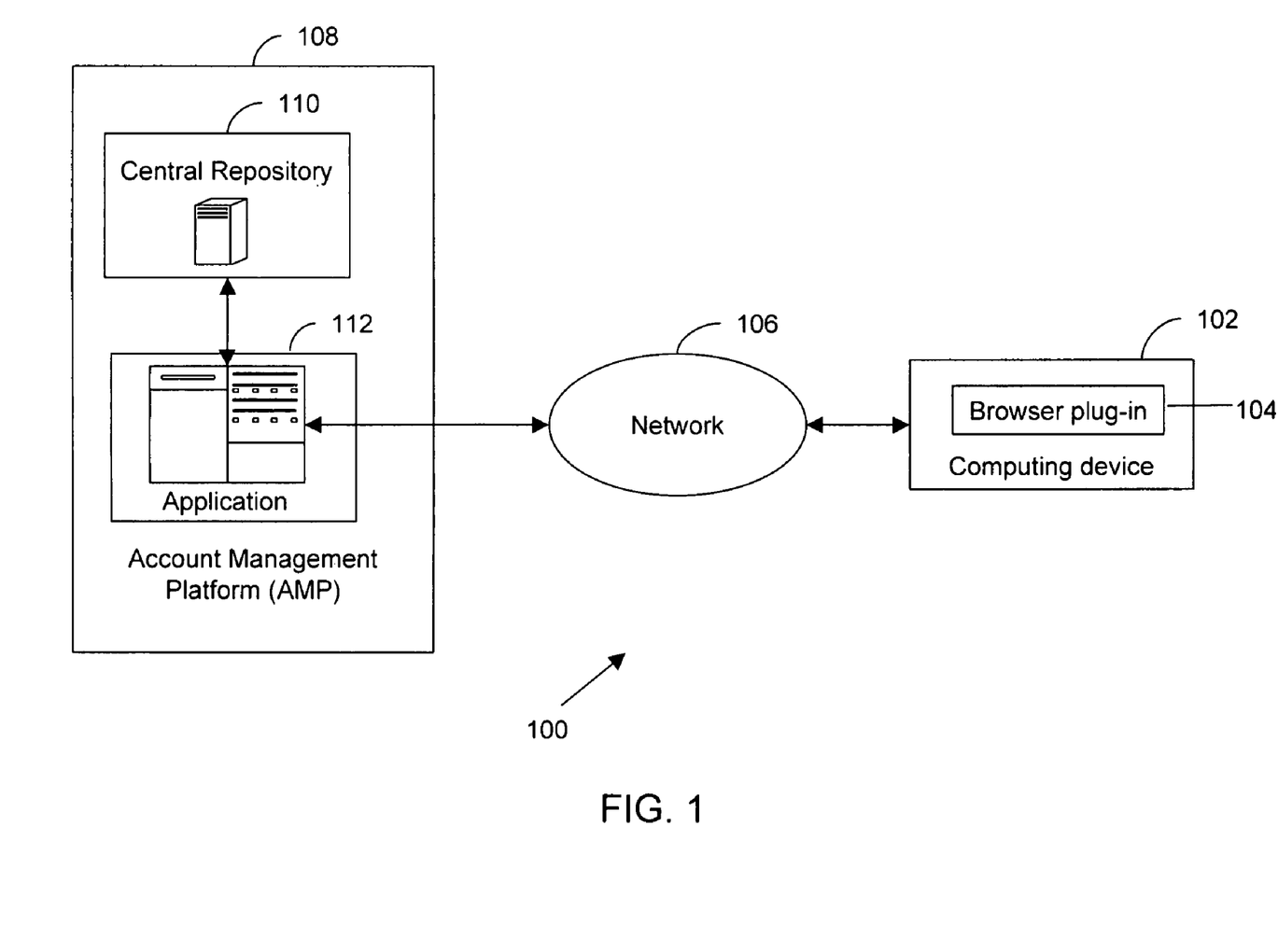
FIG. 1 illustrates an operational environment for various embodiments of the present invention.

FIG. 1 illustrates an operational environment 100 for various embodiments of the present invention. Operational environment 100 comprises a computing device 102, a browser plug-in 104 installed on computing device 102, a network 106, and an Account Management Platform (AMP) 108. AMP 108 includes a central repository 110 and an application 112. Application 112 is a web server connected to Central repository 110.

Computing device 102 can access application 112 via network 106. Computing device 102 can be a personal computer, a laptop, a personal digital assistant (PDA), a cell phone or the like. Computing device 102 supports browser plug-in 104. Browser plug-in 104 can be software or hardware or a combination thereof. In one embodiment of the invention, browser plug-in 104 comprises a graphical user interface (GUI), referred as a consolidation browser plug-in within a web browser; and a software component referred as browser plug-in software, installed on computing device 102. Browser plug-in 104 displays the GUI component inside the browser of the user in computing device 102. An exemplary browser is the Microsoft Internet Explorer. However, the invention should not be considered limited to the use of the Microsoft Internet Explorer only. Other browsers such as Netscape Navigator, Mozilla, FireFox, Safari or any other browser can also be used. The GUI component of browser plug-in 104 provides the user with interactive graphical images. The actions performed, using graphical images provided by GUI, give commands to the browser plug-in 104. For example, the user can click a button in the GUI to view a customized list of billers. On clicking the button, the browser plug-in 104 will interact with AMP 108 to extract this information from central repository 110 and display it to the user inside the browser. The GUI component is a front end to give commands to browser plug-in 104. For example, when the user makes a selection to view a list of billers from the GUI, browser plug-in 104 extracts the requested information and displays it on the screen.

The GUI component of Browser plug-in 104 is displayed each time a web browser is launched by the user on computing device 102. According to an exemplary embodiment, the GUI is displayed and browser plug-in 104 is activated after the user's authentication. Browser plug-in 104 communicates with AMP 108 through network 106. Browser plug-in 104 provides user information at computing device 102 to AMP 108.

Browser plug-in 104 can be created by using C++ as the programming language. However, it should not be considered that the use of programming language is limited to C++. Other programming languages such as Visual Basic, C#, Java or any other language may be used.

According to an embodiment of the invention, the user can download browser plug-in 104 from a web page hosted by AMP 108. In another embodiment of the invention, the user can purchase browser plug-in 104 from the service provider in the form of a computer program product, such as a CD ROM, a memory stick or card, and the like. In this case, the service provider can be the operator of AMP 108. In a further embodiment of the invention, the user can view and access browser plug-in 104 from a web page of a biller. In this case, the biller provides the browser plug-in to all its customers on the biller's web site.

Network 106 can be the Internet, a local area network (LAN), a wide area network (WAN), or any other type of fixed line or wireless communication network known to a person skilled in the art. In one embodiment of the invention, network 106 is the Internet.

Application 112 provides an interface for communication between AMP 108 and computing device 102. The interface facilitates exchange of data between computing device 102 and central repository 110 located on AMP 108. Central repository 110 stores and organizes information relating to multiple users and various web pages. More specifically, central repository 110 contains information relating to a variety of billers, their web pages and their categories. In addition, central repository 110 contains information pertaining to the profile of the user. In an embodiment of the invention, the profile of the user comprises authentication information for authenticating the user, a list of billers of which the user is a customer, information relating to payment methods employed by the user, etc. The above-mentioned system elements are explained in detail hereafter.

Central Repository 110

Central repository 110 is a database where information is stored. The information can include the profile of the user. According to an embodiment of the invention, the user profile comprises information for authenticating the user, to access AMP 108 through browser plug-in 104. The authentication information can be in the form of a user name and a password, which is provided by the user at the time browser plug-in 104, is installed. Central repository 110 also contains the information pertaining to the web pages saved by the user. The user can save web pages by clicking an appropriate button or graphical image in the GUI component of browser plug-in 104.

In an embodiment of the invention, central repository 110 includes information regarding the categories of the web pages. For example, the web pages may be categorized as bills, travel, shopping and the like. In addition to the categories, central repository 110 stores keywords and special links for each category. For example, the keywords can be 'view bill', 'pay bill' and so forth for a utility site and 'view statement' for a bank site. In an embodiment of the invention, the special links can be the sponsored links. The sponsored links can be additional links that can be provided by a web page for promoting its products, providing news or for any other special feature of the web page.

Application 112

Application 112 provides an interface for communication between browser plug-in 104 and central repository 110. More specifically, application 112 provides a web-based interface, which enables the user to communicate with AMP 108. The user may communicate with AMP 108 to view, add, modify or delete information pertaining to the user's profile or the web pages saved by the user in central repository 110. In an exemplary embodiment of the invention, each time the user provides authentication information to browser plug-in 104, application 112 verifies the authentication information. This verification is performed by comparing the profile of the user in central repository 110 with the authentication information provided by the user. The user is considered to be authenticated if the information matches. Application 112 activates browser plug-in 104 for an authenticated user.

Programs residing in application 112 provide the user with the services of the invention. According to an embodiment of the invention, the services provided include a display of a list of web pages that are of interest to the user.

Figure 2:
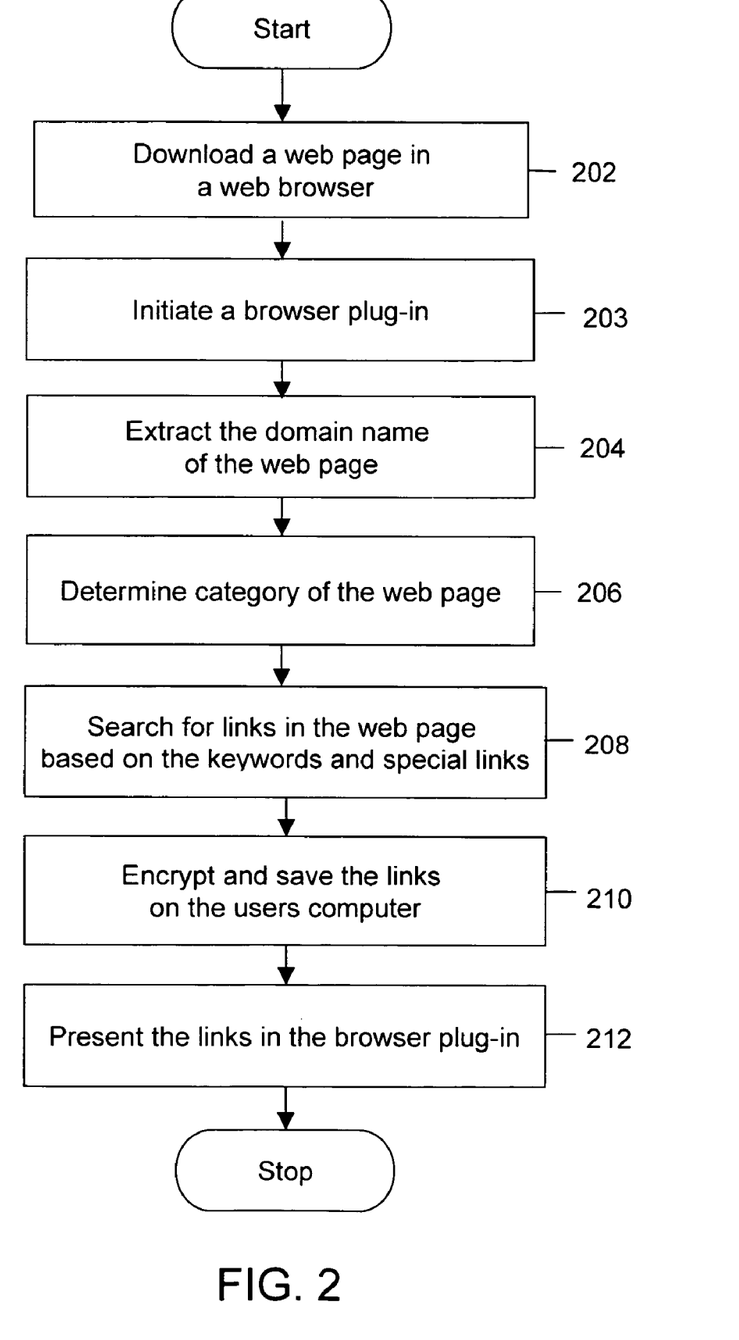
FIG. 2 is a flow chart of a method for navigating a web page, in accordance with an exemplary embodiment of the invention.

FIG. 2 is a flow chart of a method for navigating a web page, in accordance with an exemplary embodiment of the invention. At step 202, a web page is downloaded by the user in the browser by typing a URL or accessing the account from browser plug-in 104. At step 203, browser plug-in 104 is initiated, when a user downloads a new web page in the browser of the user. In an embodiment of the invention, the web page to be downloaded can be selected from a list of web pages provided by browser plug-in 104.

At step 204, browser plug-in 104 extracts the domain name from the Universal Resource Locator (URL) of the web page that has been downloaded. The domain name is used to search information relating to the web page. The domain name of the web page is used to obtain the category of the web page. Browser plug-in 104 obtains the information regarding the category from central repository 110. In an embodiment of the invention, a set of keywords is associated with each category. For identifying keywords browser plug-in searches the Central repository 110. Central repository 110 contains category such as bills, travel, shopping etc. Each category contains menu items which refer to specific web pages. For example in case of bill the menu items are "view statement", "make payment" and "payment history" etc. In the case of shopping sites it can be "my orders", "shopping cart" etc. For each menu item there is a set of menu item keywords. For example "view bill" can have the following keywords associated with it "account activity", "bill details", "billing", "manage bill", "manage your bill", "my statement", "see statement", "payment information", "statements", "view bill", "view my bill", "view my statement" etc. At step 206, browser plug-in 104 determines the category based on the web page and recognizes the menu that needs to be built from the list of Menu Items. Browser plug-in 104 identifies information from the web page for each menu item, and attempts to match the information to the menu item keywords. Moreover, browser plug-in 104 identifies keywords associated with the images that are linked to the web pages. Thereafter, at step 208, browser plug-in 104 searches for a match to the keywords in the web page. In an embodiment of the invention, a combination of keywords is used to search links in the web page. In an embodiment of the invention, browser plug-in 104 searches for an exact match to the keywords. Thereafter, a partial match is searched, if an exact match is not available. For each successful match, browser plug-in 104 associates the URL to the menu item. The menu item and the URL pairs make up the site menu.

In an embodiment of the invention, browser plug-in 104 searches for broken links on a website. Broken links are the links that do not function because a linked web page has been deleted or the address of the linked web page is modified. Browser plug-in 104 tracks the links for determining the broken links. A broken link is determined by browser plug-in when the link is clicked within a web page by the user. In an embodiment of the invention, the broken links are marked by browser plug-in 104 to help the user identify them.

In an embodiment of the invention, for individual websites browser plug-in 104 allows overriding of the links in the web site for the automatic mapping for a specific domain. In an embodiment of the invention, browser plug-in 104 marks the links which are overridden. The overriding is required when the web page associated with the link is required to be changed to a different web page or disabled. The override can be for the menu item keyword, or URL or image URL information, which is used by the browser plug-in 104 to create the URL. Browser plug-in 104 can also set up other custom menu items and URL. This is typically done by a biller/merchant who wishes to have additional links and quick links specific to their web site to be included in the menu. The menu items containing the additional links and the quick links can be edited by an editor of the website. The editing can be done after proper authentication. The editor enters the password and the user id for authentication and subsequently edits the menu items for graphical user interface. The order of presentation of the Menu Items can be preset in the central repository or automatically based on usage ranking for the web page, maintained in the central repository. In an embodiment of the invention, certain links are pre-assigned to the standard menu items. The pre-assigned links are determined on the basis of website usage. Browser plug-in 104 tracks the links clicked within a webpage by each user. Browser plug-in 104 ranks the web page by frequency of usage across all users.

In one embodiment of the invention, browser plug-in 104 searches the match for keywords by reading the program code of the web page. The web page is written in computer languages such as Hyper-Text Markup Language (HTML), Extensible Markup Language (XML), and the like. The web page can include links to information on the same web page, the same web page, a different web page, and so forth. The links are presented in an HTML or XML code by placing a linked URL between tags. For example, the tags can be an anchor tag, '<a> </a>', a hyperlink tag, '<href> </href>'. In XML code a sitemenu tag, '<sitemenu> </sitemenu>', and in HTML version 1.1 specifications, meta tag, '<meta>', can be used to define sitemenu details.

In an embodiment of the invention, browser plug-in 104 checks to see if the web page contains the <sitemenu> tag. The <sitemenu> tag includes details regarding the links contained within the web page along with the descriptions for those links. If the <sitemenu> tag is present, the details regarding the links contained within the web page can be obtained. In an embodiment of the invention, browser plug-in 104 searches for the keywords within the <sitemenu> tag. In another embodiment of the invention, browser plug-in 104 searches for information within the <a> and <href> tags. These tags include information to other links on the web page.

At step 210, the information and links obtained from the web page are encrypted and saved on the user's computer. In an embodiment of the invention, industry standard encryption is used for encrypting the information and links obtained from the web page. Encryption is required to maintain security of the information. In an embodiment of the invention, saving the information in the user's computer enhances the performance of browser plug-in 104 by decreasing the time required for accessing the information. In another embodiment of the invention, the information saved on the user's computer may be deleted after the user logs out of the web page. In another embodiment of the invention, the saved information is deleted after the user closes the browser.

At step 212, browser plug-in 104 presents the information saved on the user's computer and the information available from central repository 110 in the form of a menu. The menu contains descriptive labels for the links. It may also contain icons and/or page rankings. Some menu items may be inactive or disabled. In an embodiment of the invention, the links presented by browser plug-in 104 are referred to as 'quick links', 'site links' or 'account links'.

In another embodiment of the invention, browser plug-in 104 counts the number of times the user accesses the web page. For example, if the user has downloaded the web page for the first time, browser plug-in 104 will note the number of times user has accessed the web page as 1. Each time the user downloads the same web page, browser plug-in 104 increments the count by one. Browser plug-in 104 communicates this information, in relation to each web page, to application 112. In an embodiment of the invention, this information is used to rank the web page. The ranking can be based on the popularity of the web page, derived from the number of times all the user of browser plug-in 104 download the web page.

In an embodiment of the invention, the menu can be listed in a predefined order, or based on usage ranking by an individual user or community of users, or by ordering specified by a biller or the user.

In another embodiment of the invention, this information is used to identify a new biller and to add this biller to central repository 110.

In an embodiment of the invention, browser plug-in 104 is displayed in a format that is similar to the menu on Microsoft's Windows application. Other formats that are widely in use, or formats that are provided by other operating systems, may also be employed. Images and icons on browser plug-in 104 can be utilized to make it attractive and user friendly.

Figure 3:
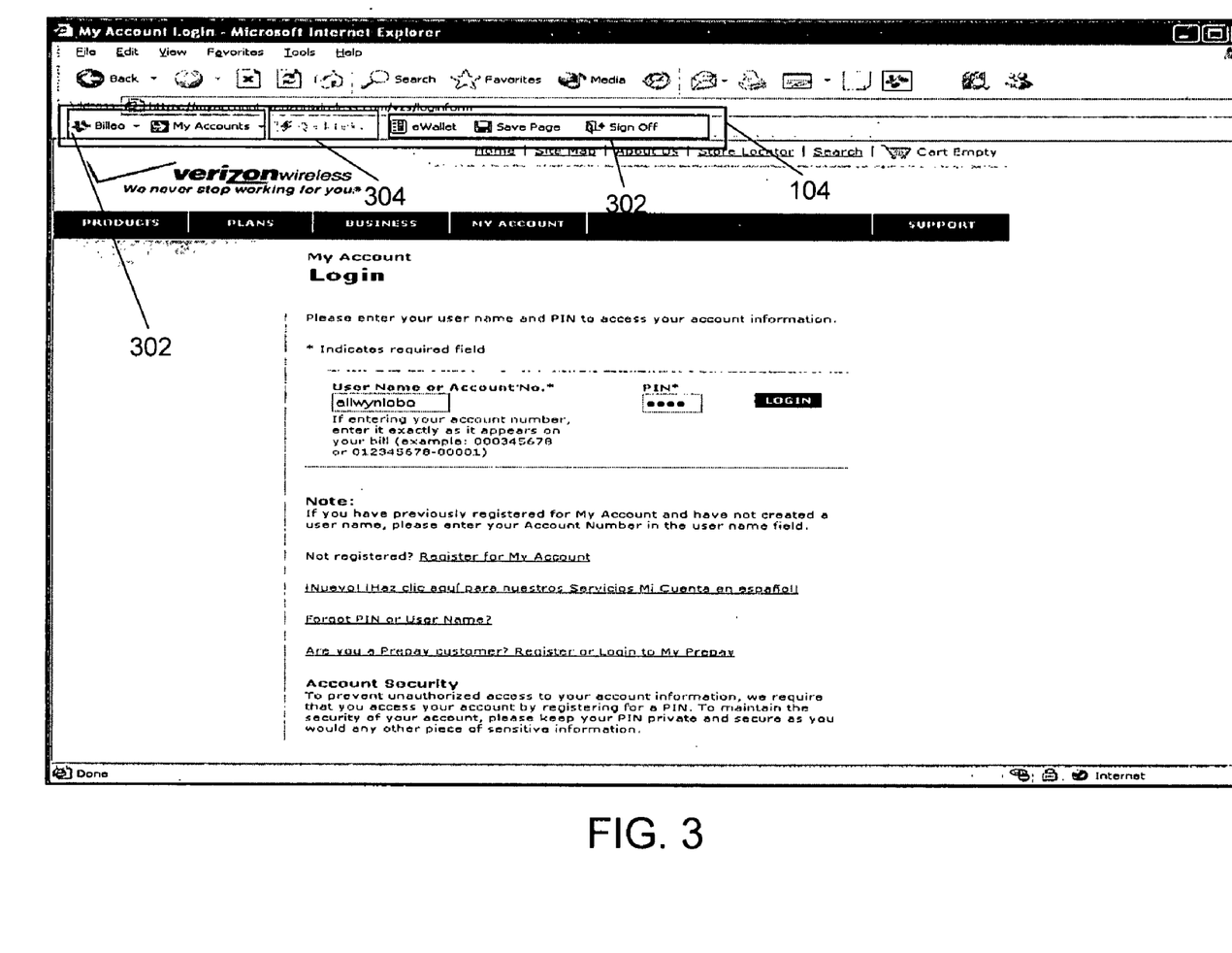
FIG. 3 illustrates the display of a browser plug-in on a web page, in accordance with an exemplary embodiment of the invention.

FIG. 3 illustrates the display of browser plug-in 104 on a web page, in accordance with an exemplary embodiment of the invention. Browser plug-in 104 displayed in FIG. 4 relates to Verizon's web page. Browser plug-in 104 can be seen on top of the web page, below the address browser plug-in, and inside the browser window. Browser plug-in 104 has been illustrated as categorized into two parts: a first part 302 and a second part 304. The first part and second part together constitutes the site menu. The first part 302 consists of four standard buttons: "My Accounts", "eWallet", "Save Page", and "Sign Off" The names and icons could be customized as needed. The second part 304 consists of buttons that display URLs that are specific to the displayed web page. The standard buttons of first part 304 encapsulate various services commonly provided by different web pages. Also, these services, for example "Sign Off", are provided after the user provides authentication for accessing a web page.

In one embodiment of the invention, the 'My Accounts' standard button of browser plug-in 104 provides a list of user accounts on various websites. For example, the user may create an account for paying bills of mobile phone, credit card and the like. The 'eWallet' standard button of browser plug-in 104 provides automated filling of forms on web pages. The forms may require information that includes standard information such as name, address, credit card number and other details of the user. The 'Save Page' standard button of browser plug-in 104 saves the displayed web page on the computer of the user. The 'Sign Off' standard button of browser plug-in 104 facilitates logging out of the application 112 and browser plug-in 104. The second part 304 includes a "Quick Link" button. In one embodiment of the invention, the 'Quick Link' button provides links to the information relevant to the user from a web page. The functions provided by the 'Quick Link' button are explained in details in conjunction with FIG. 5.

Browser plug-in 104 facilitates ease of navigation for the user since it provides an interface that is familiar to the user's sight. Example screenshot of a web page in FIG. 3 illustrates that interface provided by browser plug-in 104 is similar in appearance to the menu browser plug-in provided by Microsoft Windows™.

Figure 4:
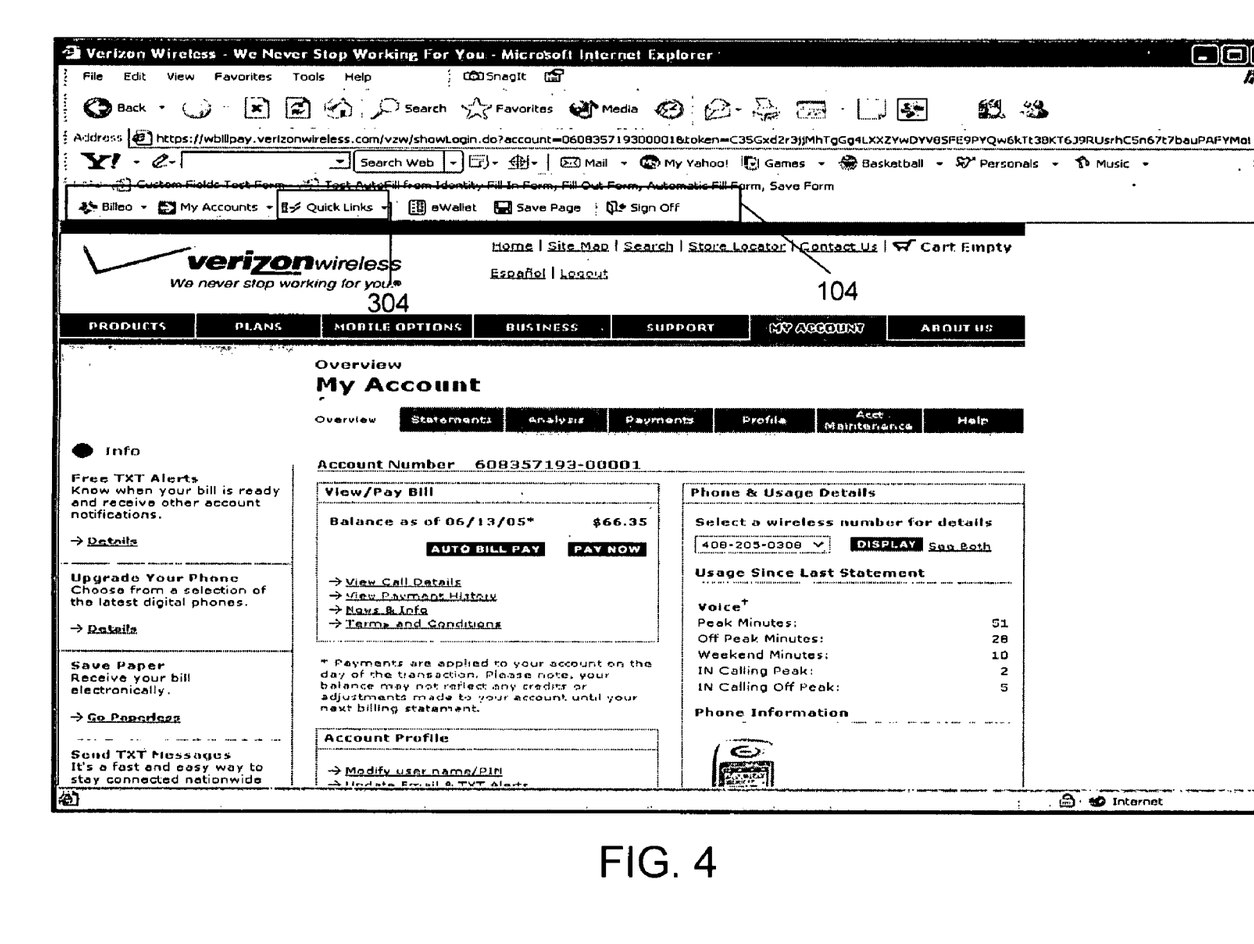
FIG. 4 is view of a display when a user logs in a web page, in accordance with another exemplary embodiment of the invention.

FIG. 4 is view of a display when the user logs in a web page, in accordance with another exemplary embodiment of the invention. In an embodiment of the invention, a 'Quick Link' button of browser plug-in 104 is displayed as inactive if the information searched, based on the category of the web page, is not available in the web page. In another embodiment of the invention, the 'Quick Link' button of browser plug-in 104 is displayed as inactive if the user is required to provide authentication before downloading a web page. For example, a user name and password are required as a means for authenticating the user to access a web page of a bank.

Figure 5:
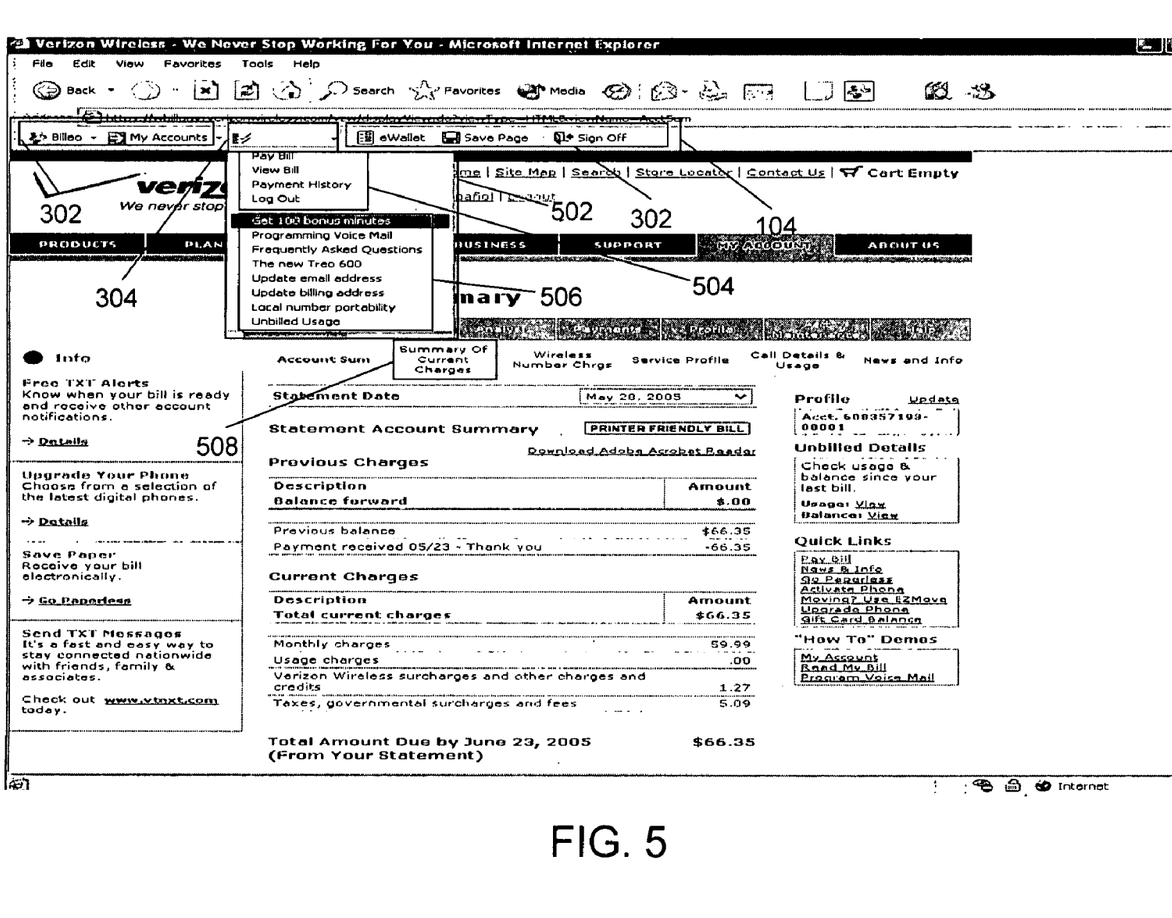
FIG. 5 illustrates a display when links included in a browser plug-in are presented to a user, in accordance with another exemplary embodiment of the invention.

FIG. 5 illustrates browser plug-in 104, in accordance with another exemplary embodiment of the invention. The 'Quick Link' standard button of browser plug-in 104 includes quick link items 502. Quick link items 502 include common links 504 and special links 506. In an embodiment of the invention, special links 506 are provided by browser plug-in 104 only if the biller of displayed web page is classified as a preferred biller. In an embodiment of the invention, quick link items 502 provide links to various services available on the web page.

Common links 504 includes links to common services provided by the displayed web page. For example, the links to common services provided by a banking web site may be bill payments, account summary, transaction details and the like.

Special links 506 provides services that are sponsored. The sponsored services include services that are specific to a web site and may be chargeable to the user. For example, the sponsored services can include promotional schemes, service updates and the like. The user can access the other parts of the web site by using the sponsored services under special links 506. In one embodiment of the invention, special links 506 is displayed below common links 504.

Text 508 is a link to a sponsored service as displayed in the web page. In an embodiment of the invention, the link to sponsored services provided by text 508 is similar to the links provided by special links 506.

Figure 6:
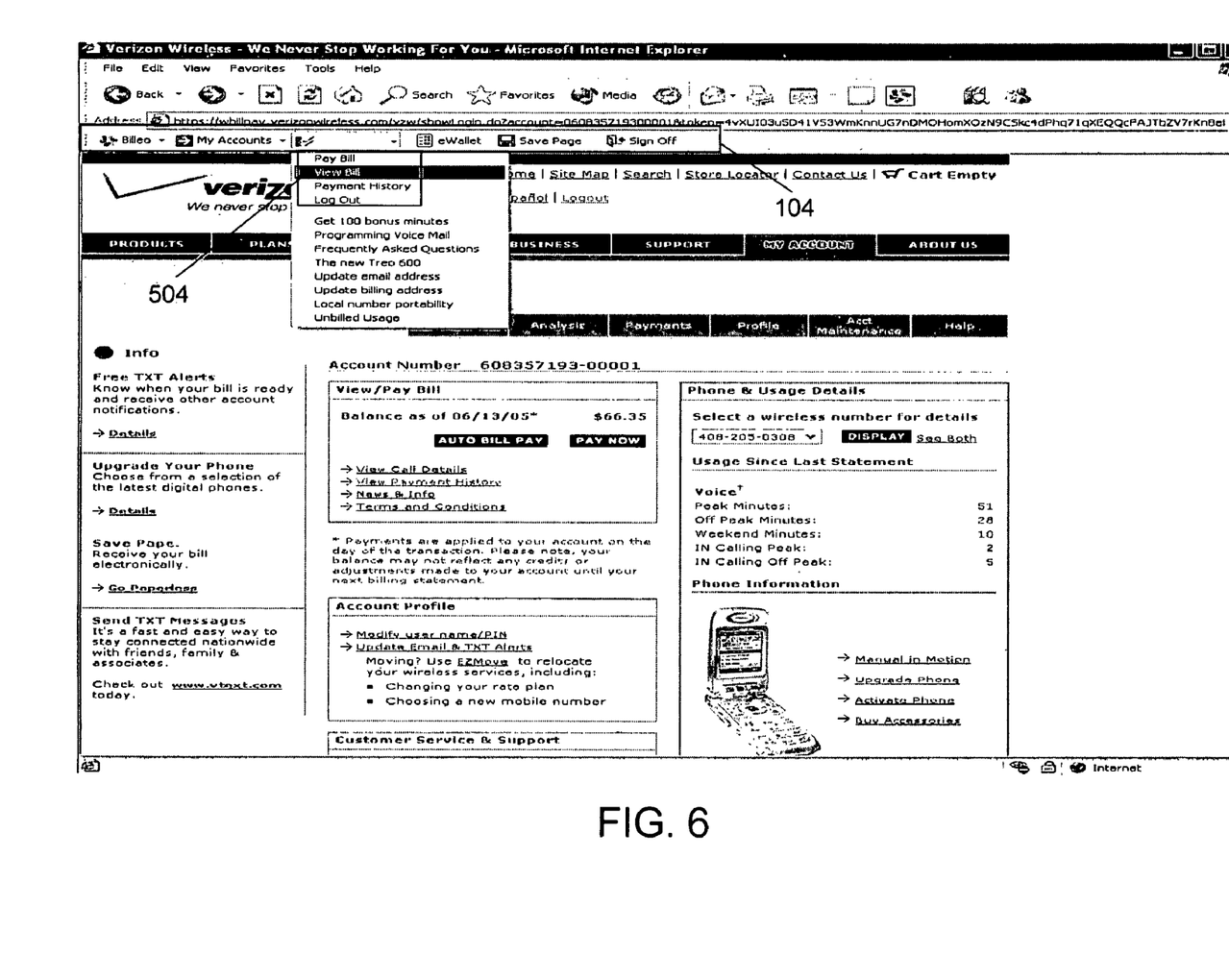
FIG. 6 illustrates a browser plug-in, in accordance with another exemplary embodiment of the invention.

FIG. 6 illustrates a display when links included in browser plug-in 104 are presented to the user, in accordance with another exemplary embodiment of the invention. FIG. 6 shows links included in common links 504, such as 'Pay Bill', 'View Bill', 'Payment History' and 'Log Out', in an exemplary embodiment of the invention. Further, the link "view bill" is associated with quick links like "account activity", "bill details", "billing", "manage bill", "manage your bill", "my statement", "see statement", "payment information", "statements", "view bill", "view my bill", "view my statement" and the like.

Figure 7:
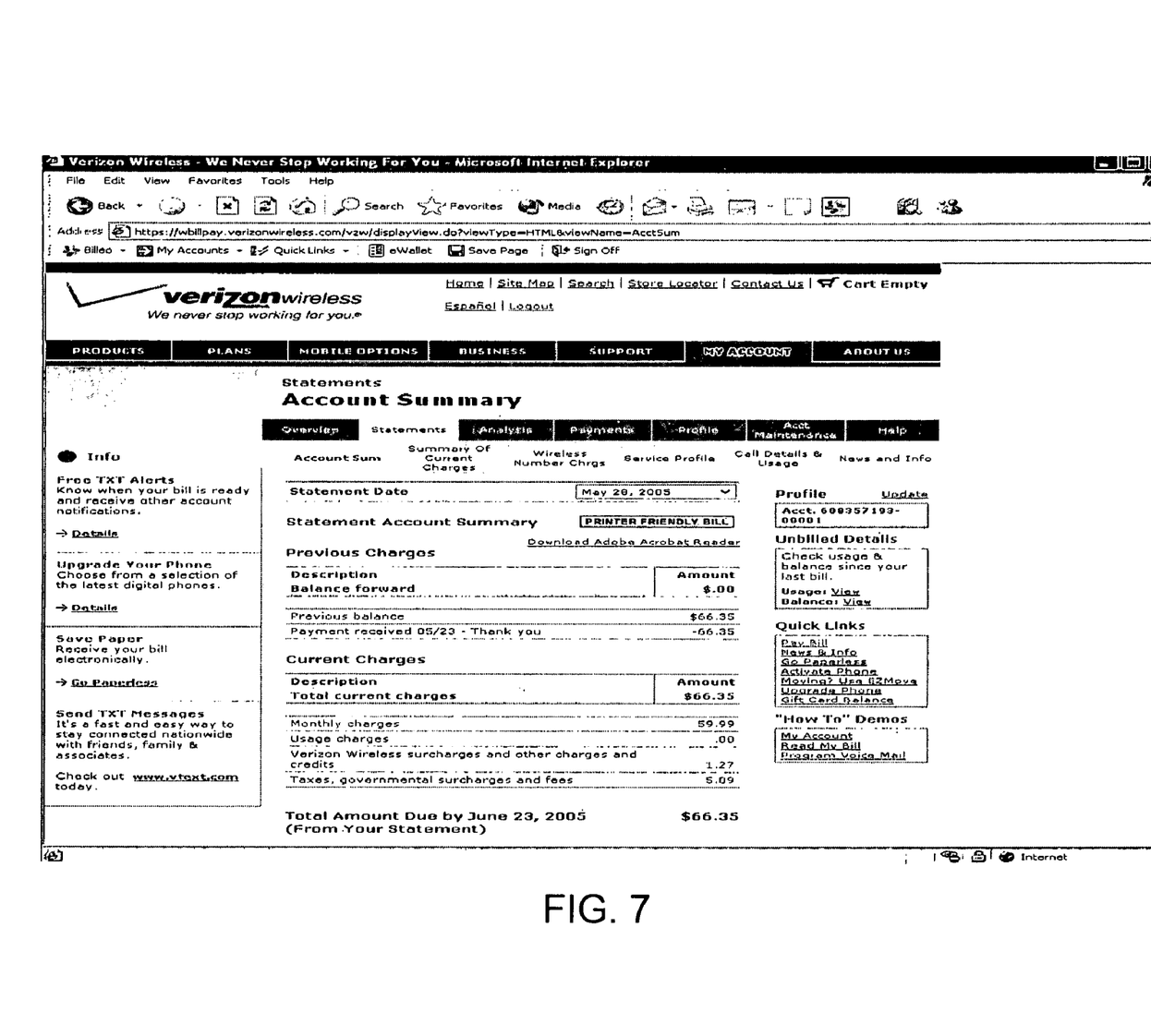
FIG. 7 illustrates a display when user makes a selection from a browser plug-in, in accordance with another exemplary embodiment of the invention.

FIG. 7 illustrates a display when user makes a selection from browser plug-in 104, in accordance with another exemplary embodiment of the invention. FIG. 7 shows an account summary for a payment of a bill. The account summary is displayed by selecting links presented by browser plug-in 104. For example, a 'View Bill' link is selected from common links 504 to display the account summary.

The various embodiments of the invention enable the user to navigate through the web site from web pages on that web site. Further, the user can fill information in a web page. Additionally, the various embodiments of the invention offer the information in a categorized manner. The various embodiments of the invention also offer the user to save information in an encrypted form on the computer of the user. Also, AMP 108 can learn about new web pages from the web pages accessed by various users of browser plug-in 104. These web pages can then be categorized according to the type of service offered therein. Thus, the present invention facilitates the user to navigate through web pages in various web sites.

A person skilled in the art can appreciate that all the connections between various elements of the system of the present invention may be wired or wireless, depending on the requirements of the system. Also, it should be noted that it is not necessary that the various processing machines and/or storage elements are physically located in the same geographical location. The processing machines and/or storage elements may be located in geographically distinct locations and connected to each other, to enable communication. This facilitates convenient and speedy navigation of web pages.

The system, as described in the present invention or any of its components, may be embodied in the form of a computer system. Typical examples of a computer system includes a general-purpose computer, a PDA, a cell phone, a programmed microprocessor, a micro-controller, a peripheral integrated circuit element, and other devices or arrangements of devices that are capable of implementing the steps that constitute the method of the present invention.

In a computer system comprising a general-purpose computer, such may include an input device, a display unit and the Internet. Specifically, the computer may comprise a microprocessor, the microprocessor connected to a communication bus. The computer may also include a memory. Memory may include Random Access Memory (RAM) and Read Only Memory (ROM). The computer system further comprises a storage device. It can be a hard disk drive or a removable storage drive such as a floppy disk drive, optical disk drive and the like. The storage device can also comprise other, similar means for loading computer programs or other instructions into the computer system.

A PDA is a mobile handheld computer system, which comprises an input device such as a stylus or a keyboard, a memory, a microprocessor, a display, and a plurality of communication ports.

The computer system comprises a communication device to communicate with a remote computer through a network. The communication device can be a wireless communication port, a data cable connecting the computer system with the network, and the like. The network can be a local area network (LAN), WLAN, or wide area network (WAN) such as the Internet, and the like. The remote computer that is connected to the network can be a general-purpose computer, a server, a PDA, and the like. Further, the computer system can access information from the remote computer through the network.

The computer system executes a set of instructions that are stored in one or more storage elements, in order to process input data. The storage elements may also hold data or other information as desired. The storage element may be in the form of an information source or a physical memory element present in the processing machine.

The set of instructions may include various commands that instruct the processing machine to perform specific tasks such as the steps that constitute the method of the present invention. The set of instructions may be in the form of a software program. The software may be in various forms such as system software or application software. Further, the software might be in the form of a collection of separate programs, a program module with a larger program or a portion of a program module. The software might also include modular programming in the form of object-oriented programming. The software program or programs may be provided as a computer program product, such as, for example, in the form of a computer readable medium having the program or programs containing the set of instructions embodied therein. The processing of input data by the processing machine may be in response to user commands, or in response to results of previous processing or in response to a request made by another processing machine.

While the foregoing is directed to embodiments of the present invention, other and further embodiments of the invention may be devised without departing from the basic scope thereof, and the scope thereof is determined by the claims that follow.

What is claimed is:

1. A method for organizing and presenting information to a user in a browser plug-in for navigating to web pages within a web site, the method comprising the steps of:
   a. downloading a web page in a web browser, the web page being downloaded by the user;
   b. determining a category for the web page;
   c. obtaining a menu template for the web page from a central repository, based on the category of the web page, wherein the menu template is obtained by the steps of:
      (i) creating the menu template in the central repository for each category for navigating web sites;
      (ii) specifying labels and images as menu items for one or more categories;
      (iii) organizing the menu template to have standard menu items for a category, and specific menu items for a web site;
      (iv) specifying a rank order for presenting the menu items;
      (v) editing the menu items for a graphical user interface, wherein the standard menu items for a web site are edited by an editor and the specific menu items for a web site are edited by a merchant after proper authentication;
      (vi) pre-assigning web links to the standard menu items;
      (vii) marking web links that are broken; and
      (viii) marking web links for allowing overriding of automatic assignment of information from the downloaded web page;
   d. capturing web links included in the web page based on the category of the web page;
   e. mapping the web links for the web page to the menu template; and
   f. presenting the web links to the user, wherein the web links are presented on the browser plug-in of the user.

2. The method of claim 1, wherein the step of downloading the web page in the web browser comprises the step of downloading the web page in the web browser, the web page being downloaded from a list of web pages provided by the browser plug-in.

3. The method of claim 1, wherein the step of downloading the web page in the web browser comprises the step of downloading the web page in the web browser by inputting a Universal Resource Locator (URL) in the web browser.

4. The method of claim 1, wherein the step of downloading the web page in the web browser comprises the step of initiating the browser plug-in in the web browser.

5. The method of claim 1 further comprising the step of checking tags in the web page, the tags providing the details regarding the web links present within the web page.

6. The method of claim 1 further comprising the step of reading a program code of the web page for searching the keywords in the web page.

7. The method of claim 1, wherein the step of presenting the web links comprises the steps of:
   a. showing a predefined order of menu items stored in the central repository;
   b. showing menu items based on ranking of web pages accessed by a user or community of users; and
   c. allowing user to add items to the menu items.

8. The method of claim 1, wherein the step of capturing the web links included in the web page comprises the steps of:
   a. encrypting the web links obtained from the web page; and
   b. saving the encrypted web links on a computer of the user.

9. The method of claim 8, further including the step of deleting the saved web links when the user logs out of the web page.

10. The method of claim 8, further including the step of deleting the saved web links when the user closes the web page.

11. The method of claim 1 further comprising the steps of:
a. determining the ranking of the webpage, the ranking of the webpage being based on the web page usage; and
b. determining broken web links in the web page, the broken web links determination for the webpage is based on the usage of the web page.

12. A computer program product for use with a stored program computer for organizing and presenting information to a user, the information being related to a web page, the computer program product comprising a computer readable medium comprising:
  a. one or more instructions for downloading the web page in a web browser, the web page being downloaded by the user;
  b. one or more instructions for determining a category for the web page;
  c. one or more instructions for obtaining a menu template for the web page from a central repository, based on the category of the web page, wherein the one or more instructions for obtaining the menu template comprises:
    (i) one or more instructions for creating a menu template in a central repository for each category or navigating web sites;
    (ii) one or more instructions for specifying labels and/or images as menu items for one or more categories;
    (iii) one or more instructions for organizing the menu template to have standard items for a category, and specific items for a web site;
    (iv) one or more instructions for specifying a rank order for presenting menu items;
    (v) one or more instructions for editing menu items for a graphical user interface, wherein the standard items for a web site can be edited by an editor and specific items for a web site can be edited by a merchant after proper authentication;
    (vi) one or more instructions for pre-assigning web links to standard menu items;
    (vii) one or more instructions for marking for web links that are broken; and
    (viii) one or more instructions for marking web links with information to allow override of automatic assignment of information from the downloaded web page;
  d. one or more instructions for capturing web links included in the web page based on the category of the web page;
  e. one or more instructions for mapping the web links for the web page to the menu template; and
  f. one or more instructions for presenting the web links to the user, wherein the web links are presented on a browser plug-in.

13. The computer program product of claim 12 further comprising:
  a. one or more instructions for determining ranking of the webpage, the ranking of the webpage being based on the web page usage; and
  b. one or more instructions for determining broken links in the web page, the broken links determination for the webpage is based on the web page usage.

14. The computer program product of claim 12, wherein the instructions for presenting the web links comprises:
  a. one or more instructions for showing a predefined order of menu items stored in the central repository;
  b. one or more instructions for showing menu items based on ranking of web pages accessed by a user or community of users; and
  c. one or more instructions for allowing user to add items to the menu items.

15. The computer program product of claim 12, wherein the instructions for capturing the web links included in the web page comprises:
  a. one or more instructions for encrypting the web links obtained from the web page; and
  b. one or more instructions for saving the encrypted web links on a computer of a user.

* * * * *